(12) United States Patent
Tuma (10) Patent No.: US 6,709,498 B2
(45) Date of Patent: Mar. 23, 2004

(54) FILTER CONSTRUCTION FOR DISK DRIVES

(75) Inventor: Daniel L. Tuma, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/931,665

(22) Filed: Aug. 16, 2001

(65) Prior Publication Data

US 2002/0089781 A1 Jul. 11, 2002

Related U.S. Application Data (60) Provisional application No. 60/225,546, filed on Aug. 16, 2000.

(51) Int. Cl.⁷ ............................ G11B 33/14; B01D 53/04
(52) U.S. Cl. .............................. 96/134; 96/140; 96/142; 55/385.6; 360/97.02
(58) Field of Search .......................... 96/134, 139, 140, 96/142, 147; 55/318, 385.6, 468, 482; 360/97.02, 97.03

(56) References Cited

U.S. PATENT DOCUMENTS

| | | | |
|---|---|---|---|
| 4,329,722 A | | 5/1982 | West |
| 4,471,395 A | * | 9/1984 | Beck et al. ............... 360/98.04 |
| 4,710,830 A | * | 12/1987 | Imai et al. ............... 360/97.03 |
| 4,857,087 A | * | 8/1989 | Bolton et al. ............. 55/385.6 |
| 4,863,499 A | * | 9/1989 | Osendorf ................... 96/134 |
| 4,888,655 A | * | 12/1989 | Bonn ....................... 360/97.03 |
| 5,030,260 A | | 7/1991 | Beck et al. |
| 5,307,222 A | | 4/1994 | Dion |
| 5,406,431 A | * | 4/1995 | Beecroft .................. 360/97.02 |
| 5,447,695 A | * | 9/1995 | Brown et al. ............... 422/171 |
| 5,876,487 A | * | 3/1999 | Dahlgren et al. ............ 96/13 |
| 5,997,614 A | * | 12/1999 | Tuma et al. ................ 96/4 |
| 6,146,446 A | * | 11/2000 | Tuma et al. ................ 95/90 |
| 6,168,651 B1 | * | 1/2001 | Tuma et al. ................ 95/90 |
| 6,208,484 B1 | | 3/2001 | Voights |
| 6,238,467 B1 | * | 5/2001 | Azarian et al. ............. 96/135 |
| 6,266,208 B1 | | 7/2001 | Voights |
| 6,395,073 B1 | * | 5/2002 | Dauber ..................... 96/134 |
| 6,475,269 B1 | * | 11/2002 | Turner ..................... 96/134 |

FOREIGN PATENT DOCUMENTS

| | | |
|---|---|---|
| EP | 0 098 007 A1 | 1/1984 |
| GB | 2 202 076 A | 9/1988 |
| JP | 62-243191 A * | 10/1987 |
| WO | WO 01 14041 A2 | 3/2001 |
| WO | WO 01 22422 A1 | 3/2001 |

\* cited by examiner

Primary Examiner—Frank M. Lawrence
(74) Attorney, Agent, or Firm—Merchant & Gould P.C.

(57) ABSTRACT

The filter construction includes a first portion that removes or reduces contaminants entering a disk drive enclosure from the external atmosphere and a second portion that removes or reduces contaminants present within the disk drive enclosure. Air exits the first portion in an area of the disk drive enclosure having a low air pressure. The second portion has an adsorbent filter, such as a recirculation filter, which allows air or gas to flow therethrough with little resistance. The filter construction has an exit positioned approximately parallel to the periphery of a disk in the disk drive enclosure, so that air exiting the filter construction is generally perpendicular to the air currents produced by the spinning disk.

12 Claims, 5 Drawing Sheets

FILTER CONSTRUCTION FOR DISK DRIVES

Priority under 35 U.S.C. §119(e) is claimed to provisional application Ser. No. 60/225,546, filed on Aug. 16, 2000, and entitled "Filter Construction for Disk Drives, and Use". The complete disclosure of application No. 60/225,546 is incorporated herein by reference.

FIELD OF THE INVENTION

The present invention relates to a filter construction and to a method for making a filter construction.

BACKGROUND OF THE INVENTION

Hard disk drives are enclosures in which an inflexible platter or disk coated with magnetic material is spun very rapidly. A magnetic read/write head "flies" only a few microns above the disk on an air cushion. The efficiency of a hard disk drive is related, in part, to the distance between the head and the disk. Thus, it is desirable to position the head as close to the disk as possible without having the head touch the disk.

Particulate and gaseous contaminants present within the disk drive can reduce the efficiency and longevity of the hard disk drive. Common sources of contaminants in disk drives include air leaks in the drive enclosure (which may or may not be intentional), the manufacturing environment, and the materials incorporated into the disk drive that give off particulates and gases. It is of particular concern that organic vapors can be generated inside disk drive enclosures during normal operating conditions when, for example, the temperature exceeds 150° F. (about 65° C.). Such temperatures can be achieved by simply leaving a computer containing a hard drive in the trunk of a car on a hot day.

Various filters have been used in disk drives for removing chemical and particulate contaminates. One type or group of filters includes recirculation filters, which are often positioned in the path of air currents in the disk drive enclosure to remove or reduce contaminants from the air present within the disk drive enclosure. These filters remove particulate and/or chemical contaminants from the circulating air. Another type or group of filters includes breather filters, which are used to remove or reduce contaminants from air entering the disk drive enclosure. Generally, breather filters cover a port in the drive enclosure that is open to air flow communication with the exterior of the enclosure. This port is typically positioned in a low static pressure area so that the pressure outside of the enclosure is greater than inside at the port position. Positioning of the port in a low static pressure area provides positive air flow from the exterior of the enclosure to the interior. The areas of lowest static pressure are located directly above and below the rotation point of disk.

What is desired is a new filter construction for use with disk drives.

SUMMARY OF THE INVENTION

The present invention is directed to a filter construction for use in a disk drive enclosure. One feature of the filter construction of the present invention is that rather than being positioned above or below the disk, the filter construction can be positioned at an outer or peripheral edge of the disk. The outlet from the filter construction, referred to as the mouth, is positioned in a low static pressure area created by the spinning disk; the outlet is not necessarily in the lowest static pressure area, but is merely within a low static pressure area. In certain embodiments, the mouth is approximately parallel to the edge of the spinning disk so that air passing through the filter construction and exiting via the mouth is approximately perpendicular to the air circulated by disk. The mouth may be concave, mirroring the shape of the disk.

The invention includes filter constructions for use in disk drive enclosures that contain a disk drive assembly. The filter construction includes a housing defining an air inlet and an air outlet; an adsorbent filter element positioned within the housing and in fluid communication with the air inlet and the air outlet, the adsorbent filter element positioned to filter air entering the drive assembly; and a recirculation filter element positioned to filter air circulating within the drive assembly. The filter is generally configured for placement in a disk drive assembly containing a rotating disk, and the air inlet of the housing is positioned farther from the center of the rotating disk than the air outlet.

In certain implementations the air inlet is configured for positioning outside an edge of the rotating disk and the air outlet is configured for positioning closer to the center of the disk, such as inside the edge of the rotating disk. The air inlet can be configured for positioning outside of an edge of the rotating disk by a distance of at least 0.1 times radius of the rotating disk, alternatively the air inlet can be configured for positioning outside of an edge of the rotating disk by a distance of at least 0.25 times the radius of the rotating disk.

In one particular aspect, the invention is directed to a filter construction that has a first filter portion and a second filter portion in a housing. The first filter portion performs breather functions while the second filter portion provides recirculation functions. The first filter portion has an inlet that is configured and arranged to provide a path for flow of air into a disk drive enclosure. Generally, the inlet covers or surrounds the port leading into the drive enclosure. The flow of air enters the disk drive enclosure through the inlet and exits the first filter portion through the mouth. The first filter portion generally includes a diffusion channel in fluid communication with the inlet and with the mouth. The diffusion channel helps slow the transfer of air into and out of the drive enclosure. The second filter portion includes a recirculation filter configured and arranged to provide a path for flow of air within the disk drive enclosure, the flow of air passing through the second filter portion.

In another particular aspect, the present invention is directed to a disk drive assembly having a disk drive enclosure and a disk positioned within the enclosure. The enclosure has an air port extending through the enclosure, and a filter construction positioned within the enclosure. The filter construction is in fluid communication with the port and includes a first filter portion and a second filter portion. The first filter portion is configured and arranged for positioning in an air stream to provide a path for the flow of air into the disk drive enclosure. Air enters the disk drive enclosure through a port, passes through the first filter portion, and then exits the first filter portion through a mouth. The second filter portion is configured and arranged for positioning in an air current in the disk drive enclosure to provide a path for flow of air within the enclosure. When the disk is spinning, the disk drive enclosure has at least one low static pressure area, and the mouth is positioned in the low static pressure area of the disk drive enclosure.

A further aspect of the invention is directed to a filter construction for use in a disk drive assembly. The filter construction includes a housing configured for placement in a disk drive assembly containing a rotating disk. The housing contains an air inlet and an air outlet; the air inlet of the housing configured to be positioned farther from the center of the rotating disk than the air outlet. The housing also contains an air scoop and a channel connecting the air scoop with the air outlet; wherein the air scoop contains an opening that is positioned at an angle to the edge of the rotating disk that promotes entry of air into the scoop.

Generally this angle between the edge of the rotating disk and the scoop is greater than zero degrees but less than a right angle. Typically the angle is greater than fifteen degrees but less than 60 degrees. Suitable angles include, for example, approximately 30 to 60 degrees. The air scoop may be substantially perpendicular to the edge of the rotating disk while the air outlet is substantially parallel to the edge of the rotating disk. Such angles benefit from the general rotation of airflow through the disk drive assembly and are meant to capture a large portion of the airflow as it moves past the filter assembly. The filter construction includes an adsorbent filter element positioned within the housing and in fluid communication with the air inlet and the air outlet, the adsorbent filter element positioned to filter air entering the drive assembly.

The filter construction also includes a recirculation filter element positioned in the air channel between the air scoop and the air outlet to filter air circulating within the drive assembly; wherein the recirculation filter has a width exposed to air passing through the air channel, and the recirculation filter is positioned in the air channel so that the exposed width is greater than the air channel width at the recirculation filter position.

DETAILED DESCRIPTION OF THE INVENTION

Figure 1:
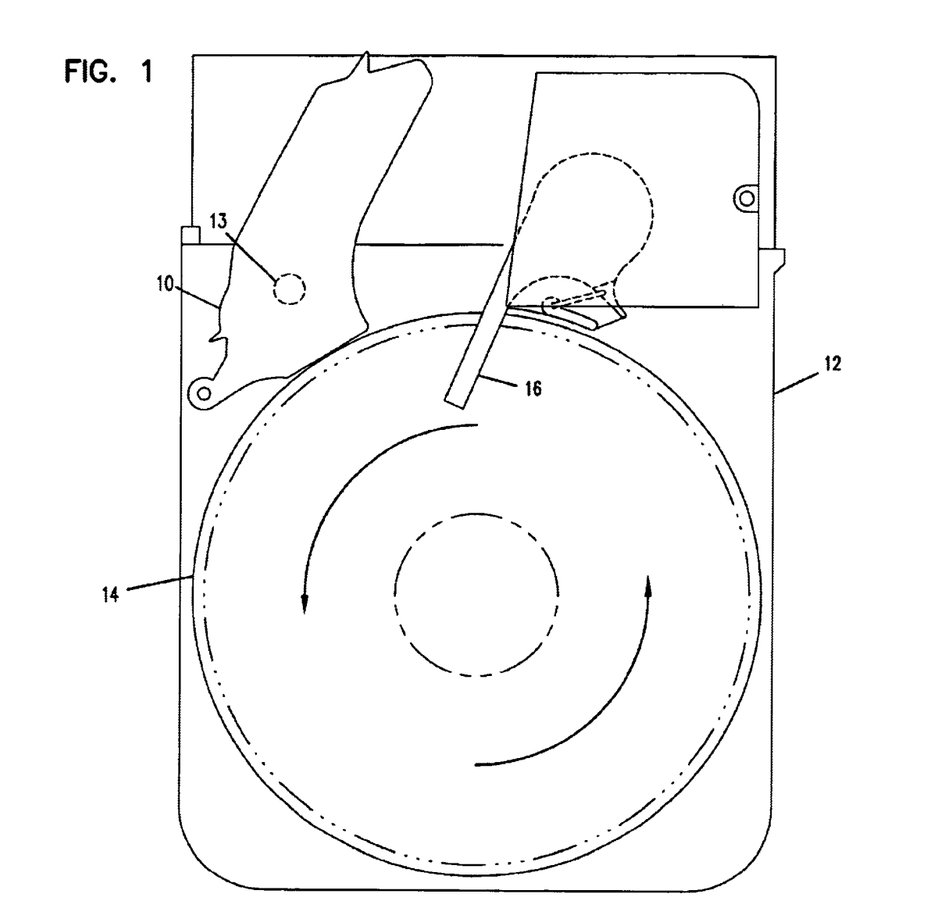
FIG. 1 is a schematic top view of a portion of a hard disk drive containing a filter construction according to the present invention.

The invention is now described in detail with reference to the drawings, wherein like reference numerals represent like parts and assemblies throughout the several views. Referring to FIG. 1, a filter construction according to the present invention is depicted at reference numeral 10. Filter construction 10 is shown positioned in close proximity to a hard disk 14 within a hard disk drive enclosure 12. Although filter construction 10 is shown in use inside a hard disk drive enclosure 12, filter construction 10 can be used in numerous types of electronic equipment, for example, computers, video cameras, digital cameras, compact disc (CD) players, DVD players, and the like. Filter construction 10 can also be used with other electronic equipment and/or in other applications.

It should be appreciated that in the context of this invention the reference to the "reduction" or "removal" of contaminants refers to the clarification of a fluid stream (e.g., gas or liquid stream) being filtered. The stream being clarified in a hard disk drive enclosure is typically an air stream. It should be appreciated, however, that streams of other gases or liquids could also be clarified by the filter construction of the present invention. The reduction or removal of contaminants from a liquid or gas stream by a filter construction can also be referred to as entrapment, immobilization, adsorption, absorption, or otherwise binding (e.g., by covalent, ionic, coordinative, hydrogen, or Van der Waals bonds, or combinations thereof) of the contaminants inside or on the surface of the filter construction.

Filter construction 10 is designed to reduce contaminants within enclosure 12 by multiple processes or procedures. A first procedure for reducing, removing, or preventing contamination within enclosure 12 is to reduce or remove any contaminants entering enclosure 12 from regions outside of enclosure 12 (or other device). A second procedure for reducing, removing or preventing contamination from within enclosure 12 is to reduce or remove contaminants present in the enclosure atmosphere.

Referring again to FIG. 1, hard disk drive enclosure 12 has disk 14 positioned at one end. A read-write head is positioned on arm 16 and moves the read-write head above the surface of disk 14. A stream of air and gases is caused to flow or circulate in the same direction (counterclockwise) as disk 14 rotates. This air circulation creates pressure differentials through enclosure 12. The areas of lowest static pressure are generally located directly above and below the rotational axis or other rotation point of disk 14. Other areas of low static pressure are located at the outer edge or periphery of disk 14 where air speeds are very high. Generally, the areas having the highest pressure are the corners of enclosure 12 which generally have low or slow air flow patterns. The static pressure differentials can be used to an advantage by filter construction 10.

Enclosure 12 includes a port 13, which provides fluid communication (i.e., airflow) from the exterior atmosphere into drive enclosure 12. Prior to this invention, the ports have conventionally been positioned in a low static pressure area such that the pressure at the port position is greater outside of enclosure than inside. This positioning of the port in a low-pressure area provides positive airflow from the exterior of enclosure 12 to the interior where disk 14 is positioned. Air from the exterior is pulled into enclosure 12 by the pressure differential between the interior and exterior. An equal amount of air generally exits enclosure 12 through cracks and seams in enclosure 12 so that the volume of air within enclosure 12 is constant. Traditionally, a port is located directly over or under hard disk 14, and a filter placed at this location to prevent contaminants from entering the enclosure. This position is preferred by many because of the low static pressure generated by the spinning of disk 14. However, the breather filter must be kept to a relatively small thickness in order to allow for proper clearance of the disk as it spins.

A first filter portion, commonly referred to as a breather filter, is positioned over the port to remove contaminants from the air coming in through a port. Thus, any air flowing through the port into enclosure 12 must encounter the first filter portion. Unlike a traditional breather filter used at a port directly over or under disk 14, the first filter portion of the present invention generally is not located over or under disk 14, as will be explained in detail below, nor does the filter construction of the present invention need the port positioned under or over the spinning disk. Rather, with the present invention, port 13 can be positioned in an area having a high static pressure, such as a corner of the disk drive enclosure 12. The first portion of filter construction 10 of the present invention is in fluid contact with this port 13, and removes or reduces contaminants that might enter enclosure 12 via port 13.

Figure 2:
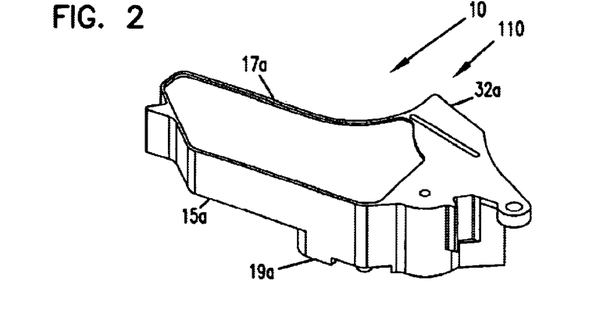
FIG. 2 is a top perspective view of a first embodiment of a filter construction according to the present invention.
Figure 3:
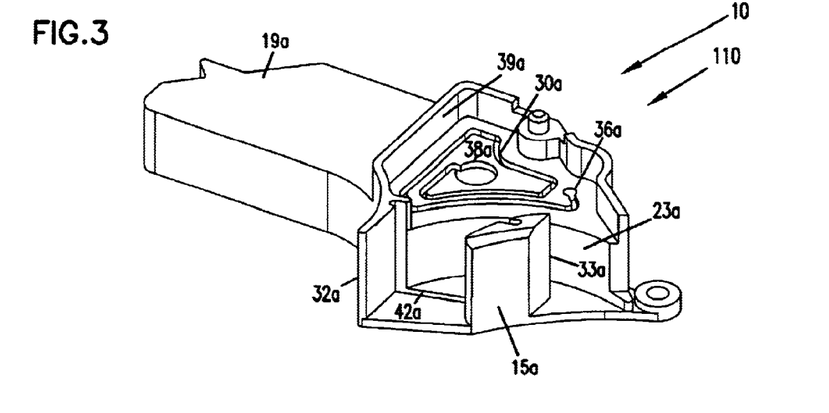
FIG. 3 is a bottom perspective view of the filter construction of FIG. 2.
Figure 4:
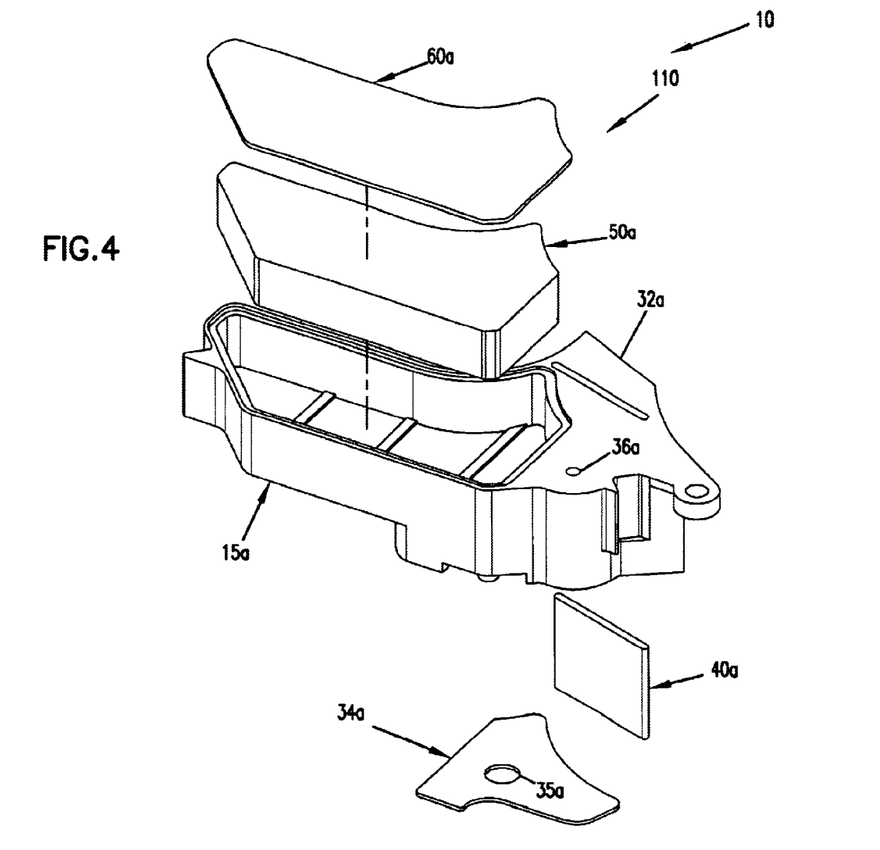
FIG. 4 is an exploded perspective view of the filter construction of FIGS. 2 and 3.

Referring now to FIGS. 2 through 4, a first embodiment of filter construction 10 of the present invention is specifically shown as first construction 110. Filter construction 110 has a housing 15a defining a first surface 17a and a second surface 19a. Housing 15a is constructed so that at least a portion of second surface 19a is in contact with the interior surface of enclosure 12. In some designs, a portion of housing 15a is spaced from, or otherwise not contacting, enclosure 12. Housing 15a is generally made from a moldable polymeric material, such as polypropylene, polyethylene, polycarbonate, and the like.

Filter construction 10 includes a first portion to remove contaminants from the incoming air; this is similar to the first filter portion described above. The first portion of filter construction 110 includes diffusion channel 30a, which primarily reduces chemical contaminants diffusing into enclosure 12 from the incoming air, and can also remove particulate contaminants by its tortuous path.

Diffusion channel 30a provides an extended length of passage between an inlet and an outlet compressed into a small space. This tortuous passage can be configured, for example, as an inwardly spiraling channel, an outwardly spiraling channel, or as a maze-like configuration. Diffusion channel 30a provides a plenum that allows air to flow from the inlet to the outlet displaced from the inlet. Specifically, diffusion channel 30a allows slow diffusion of gases into and out of enclosure 12; the rate of diffusion is largely dependent on the concentration gradient along the length of diffusion channel 30a. The inlet of diffusion channel 30a is positioned over or in close proximity to port 13 in enclosure 12.

Diffusion channel 30a can be made from a single plastic piece with a tortuous channel carved or molded in the surface thereof, so that the channel is open to the atmosphere. The molded surface having the channel therein is then sealed with an impermeable membrane or film, such as mylar, to seal the diffusion channel so that a set number of outlets are present. In another embodiment, the channel is positioned against another surface, such as an inner surface of disk drive enclosure 12; the surface seals the diffusion channel so that the desired number of outlets is present. In yet another embodiment, two plastic pieces may be molded to fit together with a channel therebetween to form diffusion channel 30a. In many embodiments, there is only one outlet, such as outlet 38a, from the diffusion channel.

An example of a diffusion channel for use with computer disk drive systems is described in U.S. Pat. No. 4,863,499 (Osendorf). Another example of a suitable diffusion channel 30a, which includes a channel defined by a layer of film, is described in U.S. Pat. No. 5,997,614 (Tuma et al.), both cited patents being incorporated herein by reference in their entirety.

The particular diffusion channel 30a of filter construction 110 is a single piece of plastic with a tortuous channel molded in the base. As best seen in FIG. 3, air from port 13 enters diffusion channel 30a via inlet 36a, travels the tortuous path, and then leaves diffusion channel 30a via outlet 38a. A layer 34a, having therein a hole 35a aligned with outlet 38a, is provided to seal channel 30a. This layer 34a may be an adhesive layer that can be used to attach filter construction 110 to enclosure 12. Layer 34a can be an air permeable or impermeable material, but is typically impermeable. In one embodiment, layer 34a is a urethane gasket having an adhesive surface. In another embodiment, layer 34a is a chemical adsorption filter, such as a chemical adsorption breather filter.

From diffusion channel 30a, the airflow progresses to an air chamber 39a. Air chamber 39a is a wide, unobstructed volume in fluid communication with outlet 38a and with enclosure 12. Air within chamber 39a can move freely out from chamber 39a through a mouth 33a into enclosure 12. Filter construction 110, and every filter construction 10 in accordance with the present invention, is designed so that air chamber 39a is in fluid communication with a low-pressure area within enclosure 12, such as a low-pressure area present at a periphery of disk 14 when disk 14 is spinning. The term "mouth" is used to represent the area through which air exits from filter construction 110.

Mouth 33a is generally parallel to the air currents and to the periphery of disk 14. Air flowing from air chamber 39a through mouth 33a is generally perpendicular to the air currents created by spinning disk 14. In the case of filter construction 110, air chamber 39a is sufficiently wide and unobstructed so that the airflow from diffusion channel 30a to mouth 33a at the low-pressure area at the periphery of disk 14 is generally unobstructed. By having outlet 38a essentially in or connected to a low-pressure area, air is pulled through diffusion channel 30a from port 13 and inlet 36a by the air pressure differential. Once through diffusion channel 30a and air chamber 39a, the air is mixed with air already present in enclosure 12 and is subjected to the filtering effects of the second portion of filter construction 110.

The inlet 36a is normally constructed in a location of higher air pressure than the mouth 33a to promote movement of air through port 13, into inlet 36a, and ultimately out through mouth 33a. Generally inlet 36a is positioned more distant from the center of the disk 14 than mouth 33a. These distances can be measured, for example, in terms of the radius of the spinning disk 14. Such measurements are useful because they relate to the relative size of the drive enclosure and thus provide a useful measurement regardless of how large the drive is. In certain implementations, inlet 36a is positioned further from the center of the disk than the mouth 33a by a distance of more than 0.1 times the radius of the disk. Thus, if the disk has a radius of 1.5 inches, the inlet 36a would be at least 0.15 inches farther from the center of the disk than mouth 33a. In other implementations, inlet 36a is positioned further from the center of the disk than the mouth 33a by a distance of more than 0.25 times the radius of the disk. In yet other implementations this distance is greater than 0.4 or 0.6 times the radius of the disk.

Filter construction 110 also includes a second portion, used to remove or reduce contaminants present within enclosure 12; this is similar to the second filter described above. The second portion of filter construction 110 includes an adsorbent material 50a and a membrane 60a, which remove chemical and particulate contaminants, respectively, from the air, and a recirculation filter 40a.

Referring again to FIG. 1, air within enclosure 12 rotates in a counterclockwise pattern, the same direction as disk 14 spins. Filter construction 110, positioned as filter construction 10 in FIG. 1, has air currents passing over it; these air currents are created by spinning disk 14. In this embodiment, the second portion of filter construction 110 includes an adsorbent material 50a, an air permeable membrane 60a, and a recirculation filter 40a, all of which remove chemical contaminants from the air. In some embodiments, one or more of these elements may also remove or reduce particulate contaminants from the air. Preferably, this second portion of filter construction 110 has a pressure drop across it.

Adsorbent element 50a is configured primarily for the removal of airborne chemical contaminants from air that passes in close proximity to that portion of filter construction 110. Element 50a is designed to remove contaminants from the air entering the enclosure atmosphere by either adsorption or absorption. As used throughout this application, the terms "adsorb", "adsorption", "adsorbent" and the like, are intended to also include the mechanisms of absorption and adsorption. Typically, adsorbent element 50a is selected to be stable and adsorb contaminants within normal disk drive operating temperatures, for example, about 10° C. to 50° C.

Adsorbent element 50a adsorbs or absorbs one or more types of contaminants, including, for example, water, water vapor, acid gas, and volatile organic compounds from the internal air stream. Adsorbent element 50a typically includes a physisorbent or chemisorbent material, such as, for example, a desiccant (i.e., a material that adsorbs or absorbs water or water vapor) or a material that adsorbs or absorbs volatile organic compounds, acid gas, or both. Suitable adsorbent materials include, for example, activated carbon, impregnated carbon, activated alumina, molecular sieves, silica gel, and silica. These materials can be combined with or impregnated with, for example, potassium permanganate, calcium carbonate, potassium carbonate, sodium carbonate, calcium sulfate, or mixtures thereof. Although adsorbent element 50a can be a single adsorbent material, mixtures of materials are also useful, for example, silica gel can be blended with activated carbon. In some embodiments, adsorbent element 50a includes layers or combinations of adsorbent material, so that different contaminants are selectively removed as they pass through the different adsorbent materials.

Adsorbent element 50a can be a loose powder (for example, it passes through 100 mesh) or granular material (28 to 200 mesh). Alternately, adsorbent element 50a can be shaped into a unitary form, such as a granule, bead, or tablet that optionally can be further shaped. In at least some instances, a shaped adsorbent article substantially retains its shape during the normal or expected lifetime of filter construction 110. The shaped adsorbent article can be formed from a free-flowing particulate material combined with a solid or liquid binder that is then shaped into a non-free-flowing article. The shaped adsorbent article can be formed by, for example, molding, compression molding, or an extrusion process.

Preferably the composition of a shaped adsorbent article (i.e., adsorbent element 50a) includes at least about 70% by weight, and typically not more than about 98% by weight, adsorbent material. In some instances, the shaped adsorbent article includes 85 to 95%, preferably, approximately 90% by weight adsorbent material. The shaped adsorbent article typically includes not less than about 2% by weight binder and not more than about 30% by weight binder. Further information regarding mold releases, other additives, and molding techniques are discussed in U.S. Pat. Nos. 5,876,487, 6,146,446, and 6,168,651, the entire disclosures of which are incorporated herein by reference.

Another embodiment of a suitable adsorbent element 50a includes a carrier. For example, a mesh or scrim can be used as a carrier to hold the adsorbent material and binder. Polyester and other suitable materials can be used as the mesh or scrim. This carrier material can be used as a base on which the adsorbent material is adhered, or the carrier material can be provided on the exterior of a mass of adsorbent material to hold the material together. Typically, any carrier is not more than about 50% of the weight of the adsorbent element, and is more often about 20 to 40% of the total adsorbent weight. The remainder of a shaped adsorbent article is the same or similar to that without the carrier. The amount of binder in the shaped adsorbed article with the carrier typically ranges from about 10 to 50% of the total adsorbent weight and the amount of adsorbent material typically ranges about 20 to 60% of the total adsorbent element weight.

Specifically, in one embodiment, adsorbent element 50a of filter construction 110 is a pouch-type element, which has an adsorbent material held within a structure such as housing 15a. The structure can be a molded, cast, or otherwise shaped element. Air permeable membrane 60a allows air flow to and through adsorbent element 50a retained within housing 15a. In some embodiments, air permeable membrane 60a also has a filtering function. For example, the membrane can be a particulate or solid contaminant removal element. In one embodiment, air permeable membrane 60a is a polytetrafluoroethylene (PTFE) membrane. In another embodiment, air permeable membrane 60a is a scrim material. For some filter constructions, two different air permeable materials can be used; for example, a first surface can have a PTFE membrane and a second surface can have a nonwoven scrim material. In the particular construction of filter construction 110, the airflow through air permeable membrane 60a is fairly low because of the position of membrane 60a and adsorbent element 50a.

Filter construction 110 also includes recirculation filter 40a, which removes particulate contaminants, and optionally chemical contaminants, from an air current that is directed by housing 15a. As best seen in the bottom view of filter construction 110 in FIG. 3, air rotating in a counter-clockwise pattern enters scoop 32a, travels through an air channel 23a defined by housing 15a, and exits via mouth 33a. Airflow passing from scoop 32a to mouth 33a through air channel 23a passes through recirculation filter 40a. Air scoop 32a is preferably designed with an orientation that increases flow of air through channel 23a. This can be accomplished, for example, by facing air scoop 32a into airflows within the enclosure. Rotation of the disk in the enclosure can produce currents of air that travel along the edge of the disk in the same approximate direction as the rotating disk. Positioning of the air scoop 32a can increase air flow through the recirculation filter by facing the scoop toward these air currents. Thus, the air scoop 32a is generally not parallel to the edge of the disk but is instead positioned at an angle great enough to promote air flow into the scoop. This angle is usually greater than 15 degrees (between the air scoop opening and the disk edge) but less than 120 degrees, and more generally less than 90 degrees.

Air channel 23a can be sized and shaped to facilitate the air passing therethrough from scoop 32a to mouth 33a. Air channel 23a, in particular the wall that forms air channel 23a, is generally concave in shape; that is air channel 23a is not straight, but has a curvature associated therewith. Each of the interior and exterior walls defining air channel 23a preferably has a curvature associated with it. By the term "exterior wall" it is intended the wall having scoop 32a and mouth 33a therein and positioned closer to disk 14 than the "interior wall". The curvature of either may be an arc segment, meaning that it is a section of a circle having a radius; the center of curvatures may be centered with the axis of rotation of disk 14, or may be positioned elsewhere. The curvature of the interior wall may be different than the curvature of the exterior wall and/or the center of the curvature of the interior wall may be positioned elsewhere than the curvature of the exterior wall. In some designs, it is preferred that the curvature of air channel 23a, particularly that of the exterior wall, is similar to the curvature of disk 14. In the shown embodiment of filter construction 110 of FIGS. 2 through 4, the exterior wall curvature center is the same as the rotational axis of disk 14 so that the exterior wall is parallel to disk 14.

Air channel 23a does not necessarily have a constant width or cross-sectional area as air channel 23a progress from scoop 32a to mouth 33a. As best seen in the figures for later embodiments, but also noticeable in FIG. 3, the width of air channel 23a may not be continuous through the length of air channel 23a from scoop 32a to mouth 33a. Rather, air channel 23a can be decreased, narrowed, or otherwise restricted or constricted at some position between scoop 32a and mouth 33a. Such narrowed configurations may increase the flow of air through air channel 23a and through recirculation filter 40a. The restricted width can be located in close proximity to the position of recirculation filter 40a. The amount of width change along the length of channel 23a from scoop 32a to mouth 33a, and the position of the width change, can be designed to achieve increased filtering efficiency by recirculation filter 40a.

Recirculation filter 40a can be any particulate, chemical, or combination filter. In one embodiment, recirculation filter 40a can be a type of "pillow filter" which is meant to describe its pillowy shape. The edges of the filter are sealed to keep the components of the filter from escaping. Recirculation filter 40a generally includes at least one organic vapor removal layer and at least one particulate removal layer. The organic vapor removal layer can provide permanent removal of certain organic vapor contaminants, and the particulate removal layer can provide permanent removal of certain particulate contaminants. It should be understood that "permanent removal" refers to the removal or entrapment of contaminants that are not released from the filter construction during normal operating conditions for a particular application. In the case of the filter construction 110, the permanent removal of certain particulate and vaporous contaminants from the environment inside disk drive enclosure 12 reflects the fact that those contaminants are not released into the stream of air during normal operating conditions. During conditions that are not normal, for example, when the temperature of the organic vapor removal layer is heated in excess of normal operating temperatures, organic vapors may be released from the organic vapor removal layer.

The organic vapor removal layer can, if desired, provide some degree of particulate contaminant removal. The particulate removal layers generally do not provide for permanent organic vapor removal because the materials that make up the particulate removal layers do not physically function to achieve permanent removal of organic vapor contaminants. Although organic vapors may attach to these layers, they can usually become released during the normal operation of the hard disk drive.

Recirculation filter 40a can also include scrim layers. The scrim layers are provided to keep the components of recirculation filter 40a from escaping into the environment of disk drive enclosure 12. The scrim layers normally have a porosity that is sufficient to minimize pressure drop but, at the same time, contain the components of recirculation filter 40a. If, for example, the particulate removal layers are made of a fibrous nonwoven material, the scrim should be sufficient to keep the fibers from escaping. The scrim layers can be omitted from the filter if they are not needed to prevent components of the filter from escaping.

As seen in FIG. 4, recirculation filter 40a of filter construction 110 is, in one embodiment, a thin pillow or panel. Housing 15a defines a groove 42a (FIG. 3), located on a wall of air channel 23a between scoop 32a and mouth 33a; groove 42a is configured for receiving and supporting recirculation filter 40a in a desired orientation. With groove 42a holding the edges of recirculation filter 40a, a generally small amount of filter 40a is covered or hidden, thus increasing the amount of surface area available for filtering. It is understood that recirculation filter 40a could be supported or retained by any other suitable device or system.

Recirculation filter 40a can be positioned perpendicular to housing 15a defining air channel 23a, so that when recirculation filter 40a is positioned in groove 42a, the angle between recirculation filter 40a and housing 15a is a right angle. In this configuration the exposed width of recirculation filter 40a is essentially the same as the width of air channel 23a at that point where recirculation filter is positioned. Alternatively, groove 42a can be formed so that recirculation filter 40a is positioned in air channel 23a in a manner to optimize, or at least increase, the width and surface area of recirculation filter 40a available for passage of air therethrough. To increase the surface area of recirculation filter 40a exposed to the air passing therethrough, recirculation filter 40a can be positioned at a degree other than 90 degrees. For example, groove 42a may be constructed so that recirculation filter 40a resides at and angle from 45 to 135 degrees to the wall of air channel 23a. An angle of either 45 degrees or 135 degrees will provide a surface area increase of about 40% compared to the same recirculation filter 40a in the same air channel 23a. Other usable angles include, but are not limited to, angles such as 30 or 150 degrees, and 15 or 165 degrees, which provide a significant surface area increase.

Figure 5:
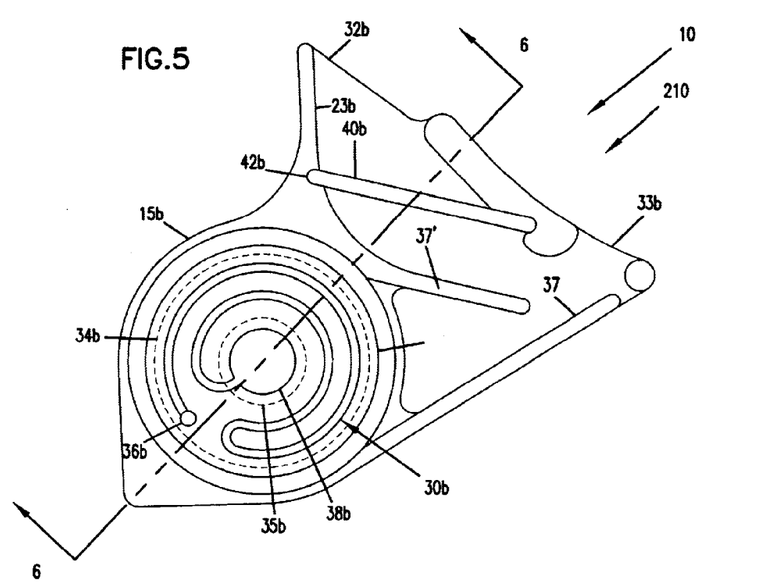
FIG. 5 is a top plan view of a second embodiment of a filter construction according to the present invention.
Figure 6:
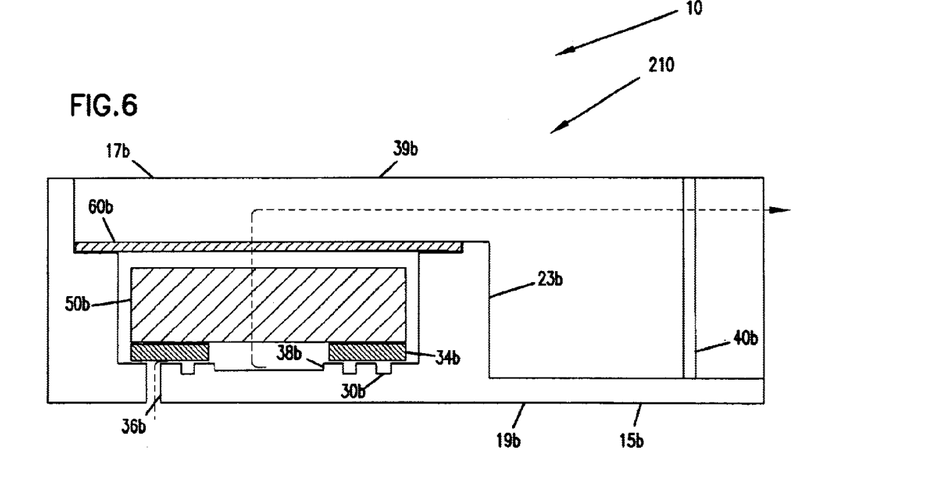
FIG. 6 is a cross-sectional side view of the filter construction of FIG. 5 taken along line 6—6.

Another embodiment of filter construction 10 is shown in FIGS. 5 and 6 as filter construction 210. For ease of identification, those elements in the second embodiment of FIGS. 5 and 6 that are the same or which perform the same function as comparable elements in the first embodiment (FIGS. 2–4) are followed by a "b" designation in FIGS. 5 and 6.

Filter construction 210 has a housing 15b defining a first surface 17b and a second surface 19b (identified in FIG. 6). Filter construction 210, when installed within enclosure 12 as illustrated in FIG. 1, would be oriented with first surface 17b facing upward out of the page. In this embodiment, the entire second surface 19b would be in contact with enclosure 12.

Filter construction 210 includes a first portion used to remove contaminants from the incoming air. The first portion of filter construction 210 includes diffusion channel 30b, an adsorbent material 50b, and air permeable membrane 60b. Filter construction 210 also includes a second portion, used to remove or reduce contaminants present within enclosure 12; the second portion of filter construction 210 includes a recirculation filter 40b.

The various elements of filter construction 210, such as diffusion channel 30b, adsorbent material 50b, air permeable membrane 60b, and recirculation filter 40b, are similar to those described for filter construction 110. However, in filter construction 210, the various elements are arranged differently and the airflow therethrough is different.

Filter construction 210 is designed for use in enclosure 12 having air port 13 positioned on the bottom surface of enclosure 12. Air enters filter construction 210 via inlet 36b, travels through diffusion channel 30b and exits diffusion channel 30b via outlet 38b, as shown in FIG. 6 by the dashed line. In the embodiment shown, diffusion channel 30b is a molded channel within housing 15b and is sealed by a layer 34b. An aperture 35b in layer 34b allows air to exit diffusion channel 30b via outlet 38b.

From outlet 38b, the air then progresses around or in close proximity to, and optionally through, adsorbent material 50b and air permeable membrane 60b into air chamber 39b. Air chamber 39b is a wide, generally unobstructed volume, defined partially by a first channel side wall 37 and a second channel side wall 37'. Air from chamber 39b flows between first channel side wall 37 and second channel side wall 37' and is deposited close to mouth 33b, where the air flows out of filter construction 210 in a flow generally perpendicular to the air currents present outside of mouth 33b, which are created by spinning disk 14. The air from chamber 39b and mouth 33b is then mixed with the air already present within enclosure 12 and this air mixture is subjected to the filtering effects of the second portion.

Referring to FIG. 5, air currents within enclosure 12, rotating in a counterclockwise pattern, enter filter construction 210 at scoop 32b, travel through air channel 23b, and exit via mouth 33b. In this embodiment, the interior wall of air channel 23b is sharply curved or radiused and the exterior wall of air channel is close to being flat, with no curvature. The width of air channel 23b narrows or constricts from scoop 32a to mouth 33b; air channel 23b narrows more than the width of air channel 23a of filter construction 110 discussed above. The width of mouth 33b may be smaller than scoop 32a by as much as 25% or even 50%. Scoop 32b and mouth 33b are preferably sized, and air channel 23b sized and shaped, to achieve the desired air flow. Air channel 23b is constructed so that air entering via scoop 32b accelerates as it travels through the narrowing channel 23b. The orientation and position of second channel side wall 37' helps to direct the air out through mouth 33b. The path for the air moving through channel 23b from scoop 32b to mouth 33b passes the air through the second portion of filter construction 210, which includes recirculation filter 40b. Recirculation filter 40b, held in the air path by grooves 42b in housing 15b, is typically positioned at an angle other than perpendicular to air channel 23b, as seen in FIG. 5. In the particular embodiment shown, recirculation filter 40b is parallel to second channel side wall 37', which partially defines the interior wall of air channel 23b.

Figure 7:
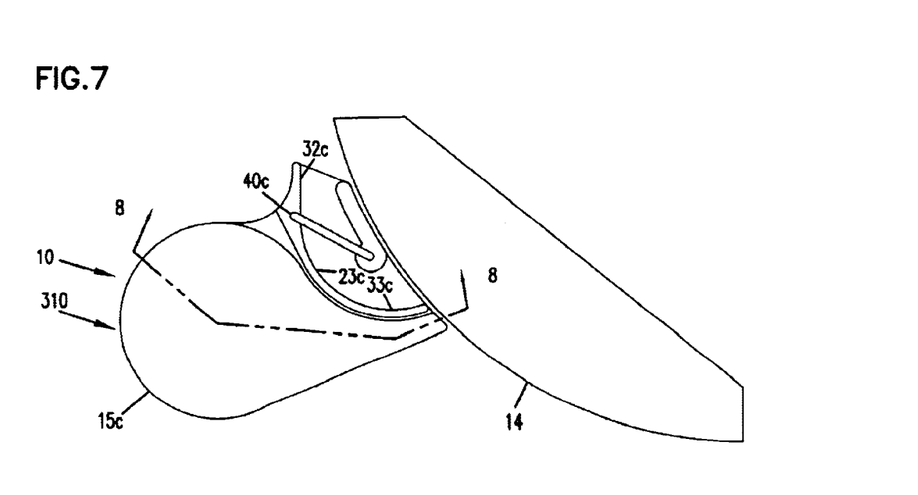
FIG. 7 is a top plan view of a third embodiment of a filter construction according to the present invention.
Figure 8:
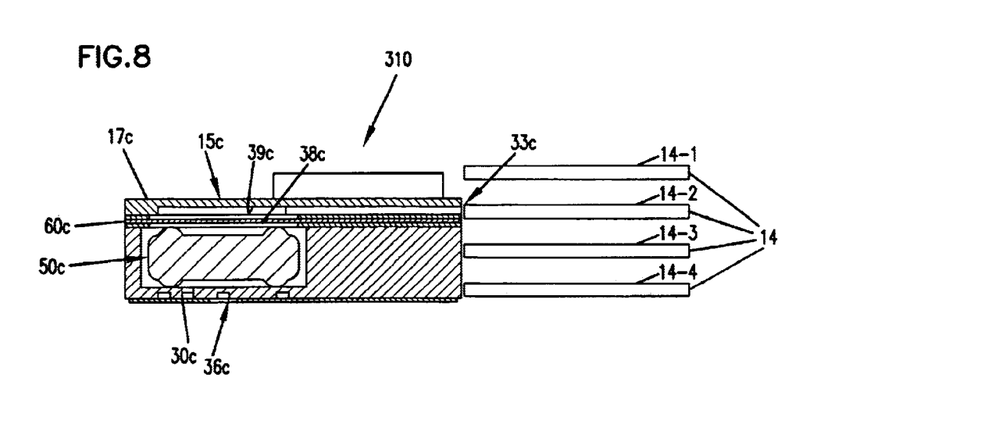
FIG. 8 is a cross sectional side view of the filter construction of FIG. 7 taken along line 8—8.

Referring to FIGS. 7 and 8, a third embodiment of filter construction 10 is shown as filter construction 310. For ease of identification, those elements in the third embodiment of FIGS. 7 and 8 that are the same or which perform the same function as comparable elements in the first and second embodiments (FIGS. 2–4 and 5–6) are followed by a "c" designation in FIGS. 7 and 8.

Filter construction 310 has a housing 15c, that, when installed within enclosure 12 and oriented as illustrated in FIG. 7, would be oriented with first surface 17c facing upward out of the page. Filter construction 310 includes a first portion, used to remove contaminants from the incoming air; the first portion of filter construction 310 includes diffusion channel 30c, an adsorbent material 50c, and air permeable membrane 60c. Further, filter construction 310 includes a second portion, used to remove or reduce contaminants present within enclosure 12; the second portion of filter construction 310 includes a recirculation filter 40c.

Filter construction 310 is similar to filter constructions 110 and 210, with one exception being the size and position of mouth 33c in relation to disk 14. In filter constructions 110, 210, air chamber 39a, 39b and mouth 33a, 33b are fairly open to allow for easy fluid communication between adsorbent material 50a, 50b and mouth 33a, 33b. In this embodiment a small mouth 33c concentrates the area through which the air from chamber 39c passes, thus decreasing the variability of flow volume per area of mouth 33c compared to larger mouths such as mouths 33a, 33b. Another exception is that the interior wall of air channel 23c is sharply curved or radiused and the exterior wall of air channel 23c has a curvature essentially identical to that of disk 14. The width of air channel 23c is fairly constant from scoop 32c to mouth 33c.

Mouth 33c is generally aligned with the outer periphery of disk 14, in particular, disk 14-2 of FIG. 8, and mouth 33c has a height that is no greater than the thickness of disk 14-2. Because the lowest static pressures are present at the areas near disk 14 having the highest air flow rates, it is desired to position mouth 33c in positions having high flow rates.

Figure 9:
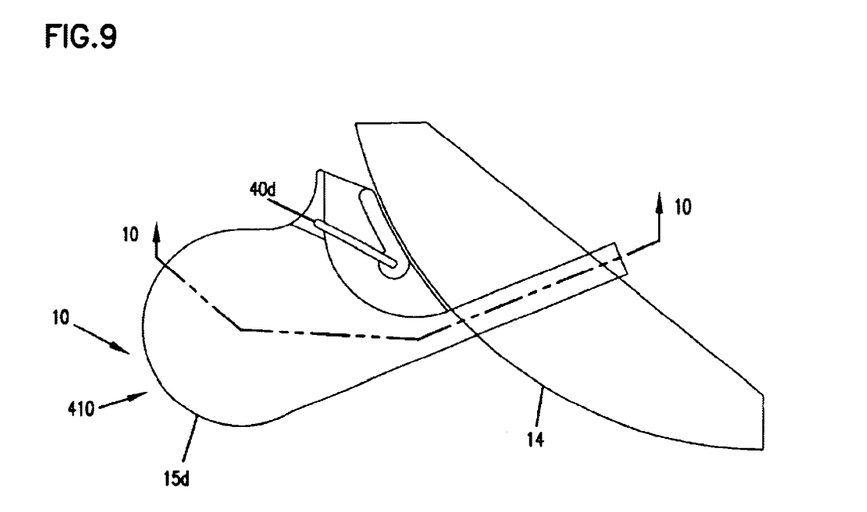
FIG. 9 is a top plan view of a fourth embodiment of a filter construction according to the present invention.
Figure 10:
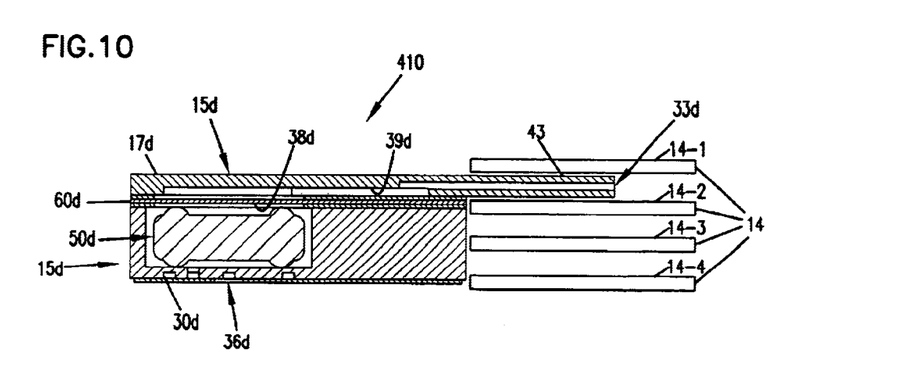
FIG. 10 is a cross sectional side view of the filter construction of FIG. 9 taken along line 10—10.

A fourth embodiment of filter construction 10 is shown as filter construction 410 in FIGS. 9 and 10. For ease of identification, those elements in the fourth embodiment of FIGS. 9 and 10 that are the same or which perform the same function as comparable elements in the first, second and third embodiments (FIGS. 2–4, 5–6 and 7–8) are followed by a "d" designation in FIGS. 9 and 10.

Filter construction 410 has a housing 15d that, when installed within enclosure 12 and oriented as illustrated in FIG. 9, would be oriented with first surface 17d facing upward out of the page. Filter construction 410 includes a first portion, used to remove contaminants from the incoming air; the first portion of filter construction 410 includes diffusion channel 30d, an adsorbent material 50d, and air permeable membrane 60d. Further, filter construction 410 includes a second portion, used to remove or reduce contaminants present within enclosure 12; the second portion of filter construction 410 includes a recirculation filter 40d.

Filter construction 410 is similar to filter construction 310 of FIGS. 7 and 8 except that filter construction 410 includes mouth extension 43 that extends from housing 15d and positions mouth 33d between stacked disks 14, in particular, disks 14-1 and 14-2 in FIG. 10. It has been found that by positioning mouth 33d between disks 14-2, 14-2, lower pressures are encountered because the airflow rate and volume are high, creating low static pressures.

The filter construction 10, such as any of filter construction 110, 210, 310, or 410 is held in the disk drive enclosure 12 by mechanical or adhesive techniques. For example, clips, a frame, or other structures can support the filter construction in enclosure 12. Any supports can be provided around the filter and can be separable from the enclosure. If desired, filter construction 10 can be welded to the frame or "fitted" in place. Pins can be used to secure filter construction 10 to protrusions on or depressions in enclosure 12. As another mechanical engagement technique, a portion of the filter construction can engage with a structure of enclosure 12. For example, a protrusion on filter construction 10 can be adapted to fit within port 13 defined by enclosure 12. Double-sided tape or other adhesive means can be used as an adhesive attachment system, as can a carrier having an adhesive coated onto a surface.

In some embodiments it is preferred that the seal between the inner surface of enclosure 12 and filter construction 10 is essentially airtight, particularly at inlet 36a, 36b, 36c, 36d. An o-ring, gasket, or other seal can be provided to minimize any air entering enclosure 12 through port 13 and passing filter construction without experiencing any filtering effects.

By having both first filtering portion and second filtering portion in the same filter construction 10, various advantages are achieved. For example, costs are decreased when a single unit is used rather than two separate units; this decreases the cost associated with manufacturing the unit (one piece versus two pieces) and decreases the time and cost associated with assembly of the enclosure 12 because only one unit needs to be placed within enclosure 12 rather than two units. This is also beneficial when removing and replacing the filter construction; only one unit needs to be removed and replaced rather than two separate units. Further, the space needed within enclosure 12 to house the unit is less for one unit compared to two units. Additionally, the filtering capabilities of the two units may be improved when combined in a single filter construction 10.

By placing filter construction 10 at a peripheral edge of disk 14, the shape and size of filter construction 10 can be designed to increase filtering capabilities; this is generally done by using the air currents to optimize airflow through filter construction 10. Additionally, there are few size and shape constraints on the shape and size of each of filter construction 10 when it is positioned to a side or peripheral edge of disk 14.

The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A filter construction for use in a disk drive assembly, the filter construction comprising:
   (a) a housing, configured for placement in a disk drive assembly containing a rotating disk, the housing comprising:
      (i) an air inlet and an air outlet; the air inlet of the housing configured to be positioned farther from the center of the rotating disk than the air outlet; and
      (ii) an air scoop and a channel connecting the air scoop with the air outlet; wherein the air scoop contains an opening that is positioned at a greater than 15 degree angle to the edge of the rotating disk, and the air outlet is substantially parallel to the edge of the rotating disk;
   (b) an adsorbent filter element positioned within the housing and in fluid communication with the air inlet and the air outlet, the adsorbent filter element positioned to filter air entering the drive assembly; and
   (c) a recirculation filter element positioned in the air channel between the air scoop and the air outlet to filter air circulating within the drive assembly; wherein the recirculation filter has a width exposed to air passing through the air channel, and the recirculation filter is positioned in the air channel so that the exposed width is greater than the air channel width at the recirculation filter position.

2. A filter construction for use in a disk drive assembly, the filter construction comprising:
   (a) a housing defining an air inlet, an air scoop, an air outlet, and a channel connecting the air scoop with the air outlet;
   (b) an adsorbent filter element positioned within the housing and in fluid communication with the air inlet and the air outlet, the adsorbent filter element positioned to filter air entering the drive assembly; and
   (c) a recirculation filter element positioned in the air channel between the air scoop and the air outlet to filter air circulating within the drive assembly;
   wherein the filter is configured for placement in a disk drive assembly containing a rotating disk, and the air inlet of the housing is positioned farther from the center of the rotating disk than the air outlet, and
   wherein the air scoop contains an opening that is substantially perpendicular to the edge of the rotating disk and the air outlet is substantially parallel to the edge of the rotating disk.

3. A filter construction comprising:
   (a) a housing defining an air inlet, an air scoop, an air outlet, and an air channel having a curved length connecting the air scoop and the air outlet; the air scoop having a width, the air outlet having a width, and the air channel having a width along its length between the air scoop and the air outlet, wherein at least at one position along the length, the width of the air channel is less than the air scoop width;
   (b) a diffusion channel in fluid connection with the inlet and the air outlet;
   (c) an adsorbent filter in fluid connection with the diffusion channel and the air outlet; and
   (d) a recirculation filter positioned in the air channel between the air scoop and the air outlet.

4. The filter construction according to claim 3, wherein the air outlet surface area is less than the air scoop surface area.

5. The filter construction according to claim 3, wherein the air outlet surface area is the same as the air scoop surface area.

6. The filter construction according to claim 3, wherein the air channel width is less than each of the air outlet width and the air scoop width where the recirculation filter is positioned in the air channel.

7. The filter construction according to claim 3, wherein the recirculation filter has a width exposed to air passing through the air channel, and the recirculation filter is positioned in the air channel so that the exposed width is greater than the air channel width where the recirculation filter is positioned.

8. The filter construction according to claim 7, wherein the exposed with of the recirculation filter is at least 15% greater than the air channel width.

9. A filter construction comprising:
   (a) a housing defining an air inlet, an air scoop, an air outlet, and an air channel having an interior wall and an exterior wall; the interior wall having a first curvature and the exterior wall having a second curvature, wherein at least one of the first curvature and the second curvature is concave;
   (b) a diffusion channel in fluid connection with the inlet and the air outlet;

(c) an adsorbent filter in fluid connection with the diffusion channel and the air outlet; and (d) a recirculation filter positioned in the air channel between the air scoop and the air outlet.

10. The filter construction according to claim 9 wherein each of the first curvature and the second curvature is concave.

11. The filter construction according to claim 9 wherein the first curvature is the same as the second curvature.

12. The filter construction according to claim 9, wherein the air scoop has a width and the air outlet has a width, the air outlet width being less than the air scoop width.

* * * * *